United States Patent
Tani et al.

[11] 4,068,925
[45] Jan. 17, 1978

[54] LIQUID CRYSTAL DISPLAY DEVICE

[75] Inventors: Chizuka Tani; Fumihiro Ogawa, both of Tokyo, Japan

[73] Assignee: Nippon Electric Company, Ltd., Tokyo, Japan

[21] Appl. No.: 532,855

[22] Filed: Dec. 16, 1974

[30] Foreign Application Priority Data

Dec. 20, 1973  Japan .................................. 48-143308

[51] Int. Cl.² ............................................. G02F 1/13
[52] U.S. Cl. ............................... 350/160 LC; 350/150
[58] Field of Search ......................... 350/150, 160 LC

[56] References Cited

U.S. PATENT DOCUMENTS

| | | | |
|---|---|---|---|
| 3,703,331 | 11/1972 | Goldmacher et al. | 350/160 LC |
| 3,749,474 | 7/1973 | Cartwell | 350/160 LC |
| 3,881,806 | 5/1975 | Suzuki | 350/160 LC |
| 3,914,022 | 10/1975 | Kashnow | 350/160 LC |

*Primary Examiner*—Edward S. Bauer

[57] ABSTRACT

A liquid crystal cell includes a nematic liquid crystal of negative dielectric anisotropy is disposed between a pair of transparent electrode substrates. The electrode substrates have on their inner surfaces small grooves formed parallel to each other, the grooves on one surface being perpendicular to those on the other surface. In the absence of a voltage applied between the substrates, the long axes of the liquid crystal molecules are perpendicular to the inner surfaces of the electrode substrates. The addition of a small amount of a cholesteric liquid crystal material markedly improves the contrast of the display.

13 Claims, 6 Drawing Figures

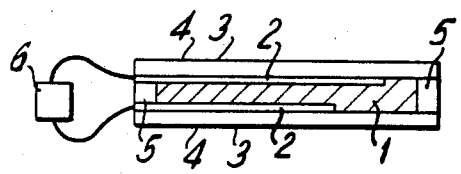
FIG.1
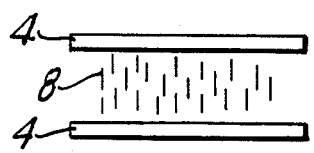
FIG.3a
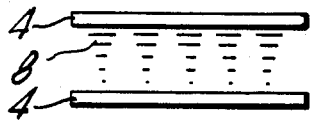
FIG.3b
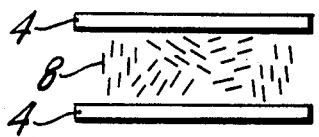
FIG.3c
FIG.2
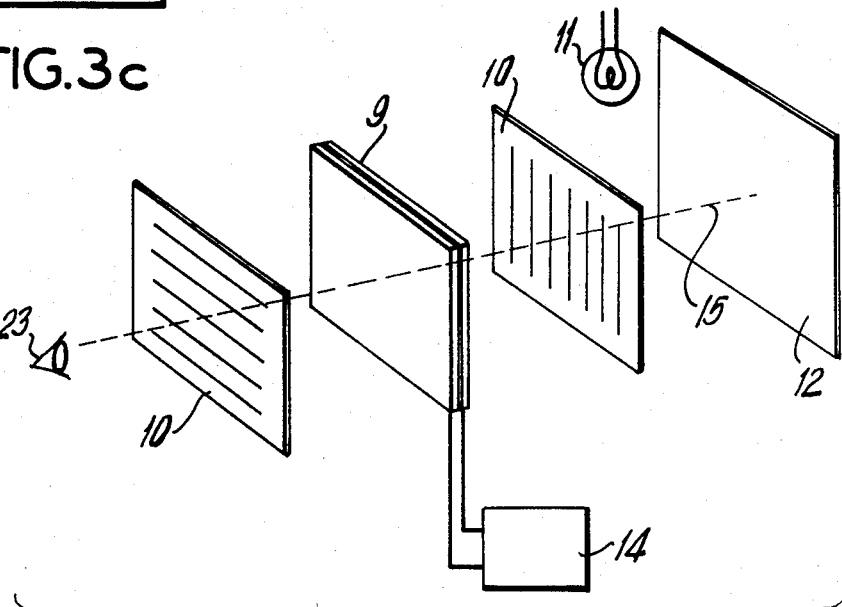
FIG.4

LIQUID CRYSTAL DISPLAY DEVICE

BACKGROUND OF THE INVENTION

The present invention relates to liquid crystal cells used for liquid crystal display devices and, more particularly, to improvements in liquid crystal cells of a type having a liquid crystal disposed between a pair of transparent electrodes.

DESCRIPTION OF THE PRIOR ART

Liquid crystals have made various electro-optic effects available to implement practical devices. Nematic liquid crystals, for instance, exhibit three electro-optic effects: the dynamic scattering mode (DSM); the deformation of vertically aligned phases (DAP); and the twisted nematic phases (TN); which have been utilized for liquid crystal display applications. These effects are obtained by suitably selecting such factors as the structure of the liquid crystal cell, the material of the liquid crystal used, and the voltage applied to the cell. The DSM effect is obtained when a dc voltage or a low frequency voltage is applied to a liquid crystal cell using a nematic liquid crystal of negative dielectric anisotropy. The DAP effect is available when a high frequency voltage is applied to a liquid crystal cell using a nematic liquid crystal of positive dielectric anisotropy, in which the molecules of the liquid crystal are aligned parallel to the surfaces of the electrodes, or of a negative dielectric anisotropy in which the molecules of the liquid crystal are aligned perpendicular to the surfaces of the electrodes. The TN effect is available when a high frequency voltage is applied to a liquid crystal cell using a nematic liquid crystal of positive dielectric anisotropy in which the molecule orientation is twisted in the liquid crystal. In liquid crystal display devices utilizing the DAP or TN effect, a pair of polarizers are usually employed on both sides of the liquid crystal cell.

The properties of prior art liquid crystal display devices vary according to the electro-optic effect they offer. The DSM type is capable of providing a bright display and the widest range of effective viewing angle, and is suited for a reflective display. The DAP type makes multiple-color display available under the application of a low voltage. The TN type permits a high contrast display and two-color display with a low applied voltage.

Because the electro-optic effects are peculiar to the individual liquid crystal cell, i.e. its material and structure, a prior art liquid crystal display device has had to use a specific liquid crystal cell whose electro-optic characteristic satisfy the purpose of the desired display. This is why a prior art liquid crystal cell is limited as to its applications, and is unable to offer a display of multiple modes. Furthermore, the display contrast of the prior art devices is generally not sufficiently high.

SUMMARY OF THE INVENTION

An object of the present invention is to provide a liquid crystal cell which in itself provides all three electro-optic effects.

It is another object of the present invention to provide a liquid crystal cell of improved display contrast capability.

With these and other objects in mind, the invention provides a liquid crystal cell having a nematic liquid crystal of negative dielectric anisotropy sandwiched between a pair of transparent electrode substrates. The molecules of the liquid crystal assume a vertical orientation pattern when no voltage is applied to the cell, and a twisted pattern or a dynamic scattering mode when a voltage is applied to the cell. The liquid crystal cell of the invention therefore makes all three electro-optic effects, viz, the DSM, DAP and TN effects, available for use in liquid crystal display devices for a multi-color display, a high contrast display and a reflective display as well.

According to another aspect of the present invention, a small amount of cholesteric liquid crystal is added to the liquid crystal cell to achieve a markedly improved display contrast.

BRIEF DESCRIPTION OF THE DRAWINGS

FIG. 1 is a sectional view showing the fundamental construction of a liquid crystal cell according to the present invention;

FIG. 2 is a schematic view showing a pair of transparent electrode substrates used for the purpose of this invention;

FIGS. 3(a)–3(c) illustrate orientation modes of a liquid crystal disposed between a pair of electrodes; and FIG. 4 is a schematic exploded perspective view showing a liquid crystal display device embodying the principles of the present invention.

DESCRIPTION OF THE PREFERRED EMBODIMENT

Referring now to FIG. 1, there is shown a sectional view illustrating the fundamental of a liquid crystal cell formed according to the principles of the present invention. A liquid crystal 1 of negative dielectric anisotropy is sandwiched between a pair of transparent electrode substrates 4 which include transparent substrates 3 coated with electrically conducting, transparent films 2, such as tin oxide films. Spacers 5 maintain a uniform thickness for the cell. A power source 6 supplies a voltage to the cell, and is connected across the transparent films 2.

The inner surfaces of the transparent electrodes are treated to effect (a) parallel orientation, and (b) vertical orientation, for the crystal. The first treatment is such that the inner surfaces of the electrode substrates 4 are rubbed with a cotton cloth in one direction whereby small grooves parallel to each other are believe to be formed on the surfaces thereof. As is well known, when the liquid crystal comes in contact with the surfaces, the long axes of the liquid crystal molecules are aligned parallel to the grooves. The second treatment is to apply an active surface agent such as lecithin to the electrode surfaces. As is also well known, when the liquid crystal comes in contact with the lecithin-coated surfaces, the long axes of the molecules of the liquid crystal are aligned perpendicular to the surfaces thereof. As shown in FIG. 2, the two transparent electrode substrates 4 are disposed with their grooves 7 perpendicular to each other.

FIG. 3 schematically depicts the orientation modes of molecules 8 of a nematic liquid crystal in a liquid crystal cell. The operation of this cell will be described hereinbelow. When no voltage is applied across the transparent electrode substrates 4, the long axes of the molecules are aligned perpendicular to the surfaces of the substrates 4 as shown in FIG. 3(a). This is because the liquid crystal is in direct contact with the surface active agent which dictates a vertical molecular orientation. Under this cell condition, the influence of the parallel molecular orientation effect is offset by the effect of the surface active agent and hence the liquid crystal remains optically isotropic.

However, when a voltage of a high frequency exceeding several hundred hertz, and a magnitude sufficient to produce a substantial electric field intensity, is applied to the liquid crystal cell, the molecular orientation assumes a twisted pattern — as shown in FIG. 3(b). In the prior art TN type liquid crystal, the molecular orientation is of a twisted pattern when no voltage is applied to the cell, and the molecules are aligned perpendicular to the electrode surfaces only when a high-frequency voltage is applied. Correspondingly, in the cell of this invention, a twisted molecular orientation occurs when a high-frequency voltage is applied. This is because the nematic liquid crystal used is of negative dielectric anisotropy, instead of positive dielectric anisotropy. Thus, when a high-frequency voltage is applied to the liquid crystal cell, the liquid crystal molecules 8 are aligned with their long axes parallel to the inner surfaces of the electrodes.

The small grooves, parallel to each other, are formed on the inner surfaces of the substrates 4 by rubbing, and are covered with a surface active agent. The surface active agent is so thin (i.e., as thin as a monomolecular layer) that the shape of the grooves appears on the surfaces of the transparent electrode substrates 4. Thus the grooves cause the liquid crystal molecules 8, which are approximately parallel to the electrode surfaces, to be aligned with their long axes parallel to the grooves. In this state, the vertical orientation effect is offset by the electric field applied. Because the grooves are perpendicular to each other on the two electrode surfaces, the liquid crystal molecules 8 assume the twisted pattern shown in FIG. 3(b). Therefore, the liquid crystal cell of the invention exhibits a twisted mode when a high-frequency voltage of a magnitude sufficient to produce a substantial amount of electric field intensity is applied to the cell.

The state of molecular orientation shown in FIG. 3(b) is a saturated state with respect to the applied high-frequency voltage. A nonsaturated intermediate state obtains during the transition from the conditions of FIG. 3(a) to that of FIG. 3(b). More specifically, when a voltage applied to the liquid crystal cell is increased graudually from zero, the liquid crystal molecules 8 become gradually slanted as the voltage exceeds a threshold, the molecular orientation remaining in the state of FIG. 3(a) until the applied voltage reaches this threshold value. When the applied voltage is further increased, the liquid crystal molecules 8 are more slanted to become nearly parallel to the electrode surfaces, whereby a twisted pattern is formed. The liquid crystal cell in this state has color-selectivity as obtained in the DAP effect of the prior art cell.

When a dc voltage or an ac voltage of low frequency lower than several hundred hertz is applied to the liquid crystal cell, the well known dynamic scattering mode (DSM) effect or the effect of a scattering mode due to "Williams domains" occurs in the liquid crystal. This state is shown in FIG. 3(c) in which the orientation of liquid crystal molucules is dynamically turbulent.

To cause the nematic liquid crystal to exhibit the DSM effect, the liquid crystal must have a certain amount of conductivity. To this end, in the prior art, a small amount of an organic electrolyte such as propylene glycol is added to the liquid crystal. Although not indispensable, the addition of the organic electrolyte is preferable even in this invention.

As has been described above, the liquid crystal cell of this invention has all the optical display functions available with the DSM, DAP and TN effects.

The liquid crystal material used for the cell of the invention may be any nematic liquid crystal of negative dielectric anisotropy, such as for example, (methoxybenzylidene)-butylaniline or its homologs, or a mixture of liquid crystal compounds. The grooves on the transparent electrode substrates may be prepared by the use of oblique vapor deposition film, instead of rubbing. As described, a surface active agent is used to cause the liquid crystal molecules to be preliminarily aligned perpendicular to the electrode surfaces. For this purpose, a known method such as one in which a high polymer (e.g., polyamide) is added to the liquid crystal may be employed instead.

FIG. 4 is a schematic diagram showing an illustrative liquid crystal display device using a liquid crystal cell of the invention for three-color display operation. A liquid crystal cell 9 includes a nematic liquid crystal of negative dielectric anisotropy, and a pair of transparent glass electrode substrates. The liquid crystal is formed of (methoxybenzylidene)-butylaniline with an additive of 0.1 weight percent organic electrolyte, i.e., tetrabutyl ammonium bromide. The above described rubbing process is to effect parallel molecular orientation, and lecithin active coating to effect vertical molecular orientation are employed. The electrode substrates are disposed perpendicular to each other with respect to the rubbing direction. The two electrodes are spaced so that the liquid crystal is kept to a thickness of 10 microns. The glass electrodes are coated with a transparent conducting film of indium oxide. A pair of linear polarizers 10 with polarization planes perpendicular to each other are installed on either side of the liquid crystal cell 9. An incandescent light source 11 and a color screen 12 are disposed on one side thereof. The color and pattern for the color screen 12 may be arbitrarily selected. A viewer 23 observes the liquid crystal cell 9 from the other side thereof, i.e., the side remote from the screen 12. When no voltage is applied to the cell 9, the liquid crystal cell 9 appears black to the viewer 23. In this state, the liquid crystal molecules have a vertically orientated optical isotropy as previously mentioned. When a high-frequency voltage of about 10 Vrms (5 kHz) is applied to the liquid crystal cell 9 from the power source 14, the color of the color screen 12 becomes visible to the viewer 13 through the cell 9 and the crossed polarizers 10. This is because the liquid crystal molecules are in a 90° twisted pattern, causing the sandwiched liquid crystal 9 to be transparent. In experiments, the threshhold voltage of the cell 9 was about 3 Vrms (5kHz).

When a dc voltage or an ac voltage of low frequency sufficient to produce a substantial electric field is applied to the cell 9 from the power source 14, the liquid crystal cell 9 is seen white to the viewer 13. In this state, the liquid crystal produces the DSM effect and scatters white light forward. In experiments, the threshold voltage in the liquid crystal cell 9 was about 4 Vrms at a driving frequency of 50 Hz, and the saturation of the scattering effect was observed when the voltage applied was around 30 Vrms.

In the FIG. 4 arrangement, the incandescent light source 11 illuminates the liquid crystal cell 9 and color screen 12, but is invisible from the viewer 13. Thus the liquid crystal display device of the invention makes three-color display available by simply choosing the kind of voltage applied to the liquid crystal cell.

The liquid crystal cell 9, of the invention has a variety of display applications. In FIG. 4, for example, when the incandescent light source 11 is installed on the center of the optical axis 15 of the display system, multiple color display ranging from red to purple can be obtained with a voltage of 3 to 10 Vrms (5 kHz) applied to the cell 9 from the power source 14. This behavior is ascribed to the DAP effect, and such an arrangement obviates the need for the color screen 12.

This liquid crystal cell 9 can be used to constitute a reflective display device of the DSM type when a mirror plate is attached to the back of the liquid crystal cell 9. In this construction, the polarizers 10 may be omitted.

When color linear-polarizers are used instead of the linear polarizers 10, a display device as in FIG. 4, can be used as a two-color display device functioning like the ordinary transparent or reflective display device of the TN type. For such a reflective display structure, it is desirable that a white plate be installed on the back of the liquid crystal cell 9.

According to the invention, a plurality of electrodes may be independently disposed in the cell. Thus, by applying a suitable voltage to each of the electrodes, the liquid crystal cell of the invention can be operated for simultaneous displays based on the DSM, DAP and TN effects.

Furthermore, an optical logic gate can be formed by the use of a plurality of liquid crystal cells and polarizers arranged in order, for example, (polarizer)-(liquid crystal cell)- (polarizer)-(liquid crystal cell)-(polarizer). Then, if the center polarizer has its polarization plane different by 90° from those of the other polarizers, this device can be operated as an optical AND gate. Such a logical gate may be formed either of liquid crystal cells of the present invention only, or from a combination of those of this invention and conventional cells.

Moreover, it has been found that the addition of 0.01 percent to a few percent by weight of some kinds of cholesteric liquid crystal materials to the aforementioned nematic liquid crystal markedly improves the display contrast (The figures are for an ordinary cell having an electrode gap of 10 to 20 microns). The nematic crystal material may be any material having a negative dielectric anisotropy as mentioned above. The cholesteric liquid crystal may be an ordinary one, such as cholesteryl erucate, cholesteryl nonanoate, cholesteryl benzoate, cholesteryl cinnamate, dicholesteryl phthalate, cholesteryl oleylcarbonate, and cholesteryl chloride.

In one practical example, 0.2 percent by weight of a cholesteric liquid crystal, cholesteryl nonanoate, was added as an additive to a nematic liquid crystal, methoxybenzilidene-butylaniline. The application of a 20-volt 10kHz ac signal gave a contrast ratio of 90 to 1. This is definitely a marked improvement over a device having only a nematic liquid crystal, which has a corresponding contrast ratio of 4 to 1. Display contrast is thus improved by a factor exceeding 20. No modification on the structure itself is needed when the cholesteric crystal material is added.

While a preferred embodiment of the present invention and particular modifications thereof have been described and illustrated in detail above, it is to be clearly understood that the invention is not limited thereby or thereto.

What is claimed is:

1. A liquid crystal cell including a nematic liquid crystal of negative dielectric anisotropy disposed between a pair of transparent electrode substrates, said electrode substrates having small parallel grooves formed on their inner surfaces, said grooves on one substrate surface being perpendicular to those on the other substrate surface, an active surface agent disposed on the inner surface of at least one substrate for rendering the long axes of the liquid crystal molecules perpendicular to said inner surfaces of said substrates in the absence of a voltage applied between said substrates.

2. A liquid crystal cell as claimed in claim 1, wherein a small amount of cholesteric crystal material is included with said nematic liquid crystal.

3. A combination as in claim 2, wherein said cholesteric material is selected from the group consisting of cholesteryl erucate, cholesteryl nonanoate, cholesteryl benzoate, cholesteryl cinnamate, dicholesteryl phthalate, cholesteryl oleylcarbonate, and cholesteryl chloride.

4. A combination as in claim 2, wherein said cholesteric crystal material comprises 0.01 to less than 1.0% by weight of said nematic liquid crystal.

5. A combination as in claim 1, further comprising electrodes included on said substrates.

6. A combination as in claim 5, further comprising a voltage source connected to said electrodes for selectively energizing said electrodes.

7. A combination as in claim 1, further comprising two optically polarized plates disposed on opposite sides of said substrates.

8. A combination as in claim 7, further comprising a screen and a light source.

9. A combination as in claim 1 wherein said inner surface of each substrate is coated with said active surface agent, and wherein said active surface agent comprises lecithin.

10. A liquid crystal device comprising: a polarizer for polarizing light entering said device; an analyzer for analyzing light after passage through said device; a first boundary substrate; a second boundary substrate, parallel to and spaced from said first substrate; said first and second substrates each having transparent electrodes on the interior surfaces thereof; a negative dielectric anisotropy, nematic liquid crystal material filling the volume defined by said first and second substrates; and said device being constructed such that said liquid crystal material is characterized by a quasihomeotropic boundary condition in the quiescent state, and a homogeneous twisted nematic bulk molecular arrangement in the active state.

11. The device as set forth in claim 10 and further comprising: said polarizer and said analyzer are first and second polarizers positioned one adjacent each substrate.

12. The device as set forth in claim 11 wherein the planes of polarization of said polarizers are orthogonal.

13. The device as set forth in claim 10 wherein said liquid crystal has a molecular twist of approximately 90° in the active state.

* * * * *